United States Patent [19]
Koganezawa et al.

[11] Patent Number: 6,156,166
[45] Date of Patent: Dec. 5, 2000

[54] ELECTROLYSIS CELL FOR GENERATION OF GAS

[75] Inventors: Akihisa Koganezawa; Yukio Akahori, both of Shizuoka, Japan

[73] Assignee: Take-One Office, Ltd., Tokyo, Japan

[21] Appl. No.: 09/292,387

[22] Filed: Apr. 15, 1999

[30] Foreign Application Priority Data

Dec. 28, 1998 [JP] Japan .................................. 10-374069

[51] Int. Cl.[7] .............................. C25B 9/00; C25B 11/03
[52] U.S. Cl. ............................................ 204/266; 204/283
[58] Field of Search .................................. 204/265–266, 204/283, 252, 257–258

[56] References Cited

U.S. PATENT DOCUMENTS

| | | | |
|---|---|---|---|
| 5,401,371 | 3/1995 | Oshima et al. | 204/266 X |
| 5,607,562 | 3/1997 | Shimamune et al. | 204/265 |
| 5,736,016 | 4/1998 | Allen | 204/266 X |
| 5,779,865 | 7/1998 | Schulze et al. | 204/252 |
| 5,989,407 | 11/1999 | Andrews et al. | 204/252 X |

FOREIGN PATENT DOCUMENTS

| | | |
|---|---|---|
| 29613308 | 9/1996 | Germany . |
| 10-25586 | 1/1998 | Japan . |
| 98/42617 | 10/1998 | WIPO . |

*Primary Examiner*—Donald R. Valentine
*Attorney, Agent, or Firm*—Wenderoth, Lind & Ponack, L.L.P.

[57] ABSTRACT

An aqueous electrolysis cell for generation of gas includes an electrolysis container having an anode chamber and a cathode chamber separated from each other by a membrane. An anode and a cathode having permeability to gas and water are fitted on respective surfaces of the membrane. A first sealing element is fitted on the anode and the membrane to surround and seal circumference of the anode, one surface of the first sealing element being in tight contact with one surface of the membrane, and the first sealing element has an opening communicating with the anode. An anode current collector plate has one surface in tight contact with the other surface of the first sealing element, and a through-hole communicating with the opening of the first sealing element. A second sealing element has one surface in tight contact with the other surface of the anode current collector plate, and an opening communicating with the through-hole of the anode current collector plate. The anode, the opening of the first sealing element, the through-hole of the anode current collector plate and the opening of the second sealing element define in the anode chamber a flow passage for gas and liquid. A conduit is provided to connect the flow passage to a separator for collecting gas generated in the anode chamber.

9 Claims, 10 Drawing Sheets

15 Inlet line for electrolyte (pure water)

16 Outlet line for ozone gas

17 Electric wiring (from the power supply to the anode)

18 Electric wiring (from the power supply to the cathode)

19 Pipeline (for letting out hydrogen and water)
20 External Equipment (anode trap)

FIG. 20

ELECTROLYSIS CELL FOR GENERATION OF GAS

BACKGROUND OF THE INVENTION

1. Field of the Invention

The invention relates to an aqueous electrolysis cell for generation of gas, wherein the cell is adapted to be easily attached to or detached from a facility which collects and uses the gas. In particular, the invention relates to an aqueous electrolysis cell which is assured both of sufficient anticorrosion characteristic and sufficient sealing characteristic against both of ozone gas and ozone aqueous solution, because ozone gas is generated in the cell.

2. Description of the Related Art

Electrolysis cells which generate ozone gas by electrolysis reaction of water are known. For instance, these known types of cells have a cathode chamber and an anode chamber which is separate from the cathode chamber by a cation-exchanger membrane made of, for example, solid electrolyte polymer. Hydrogen gas is generated in the cathode chamber. Mixed gas of ozone and oxygen is generated in the anode chamber. In many cases, the electrodes in the cells are replaced at an interval of about one or two years, particularly if the cells are used to provide ozone gas to a facility which utilizes ozone gas. Typically, the facility has a container for separation of gas from liquid. The container communicates with the anode chamber directly or via an additional line. Such a container, hereinafter referred to as a "anode trap", collects the ozone gas. The collected ozone gas is provided to the places to use it.

However, most of the structures of those conventional cells have a shortage in that most people have difficulty in disassembling them into, for example, the anode chamber, the cathode chamber, the electrodes, and so on. If such a conventional cell has been attached to and used with an anode trap with a proper period of time, and when the replacement of the electrodes are required, people in the maintenance work had to remove so many parts in order to aquire their working clearances. After the replacement of the electrodes, then those many parts must be put back to the places where they were. As a result, the overall maintenance work has been very complicated.

Recently, Japanese Patent Laid-Open (Kokai) No. Hei 10-25586 teaches a structure assembly of an aqueous electrolysis cell which can generate ozone gas, oxygen gas and hydrogen gas. The structure is made of components which can be disassembled. However, in this type of structure, in order to dismount the damaged electrodes, most of the structure's clamping bolts which have maintained the structure should be loosen or disengaged, wherein many parts around the electrodes come apart totally. Therefore, in order to assemble the parts again, many positioning works have to be done again. It is a very large burden in the maintenance work. Further, modifying this type of cell, if it were made to replace not the electrodes only but the overall structure of the cell, not only the high cost on spare parts due to the larger replacement portion but also labors to disconnect or dismount the cell from the utilities and facilities become the problem, although labors to disassemble the cell itself are omitted. Still further, due to the structure taught therein, orientation of external lines which are connected to the cell is greatly limited. Further, the cell should be located in a limited attitude in order to operate it properly. Further, many advanced skills and know-how would be required to carry out these works, which leads to high cost and high degree of difficulty in maintenance.

SUMMARY OF THE INVENTION

Thus, the object of the present invention is to provide an aqueous electrolysis cell, in which maintenance labors and costs are reduced as compared with conventional aqueous electrolysis cells, especially in the maintenance to replace its electrode portions.

Another object of the invention is to provide an aqueous electrolysis cell which can be easily attached to and detached from a facility which collects and uses the gas.

According to the invention, an aqueous electrolysis cell for generation of gas comprises an electrolysis container having an anode chamber and a cathode chamber separated from each other by a membrane, the cell being adapted to generate by electrolysis reaction of water oxygen and ozone in the anode chamber and hydrogen in the cathode chamber. The cell includes an anode having permeability to gas and water and fitted on the membrane in such a manner that one surface of the anode is in contact with one surface of the membrane. A cathode has permeability to gas and water and is fitted on the membrane in such a manner that one surface of the cathode is in contact with the other surface of the membrane. A first sealing element is fitted on the anode and the membrane to surround and seal circumference of the anode, one surface of the first sealing element being in tight contact with the one surface of the membrane, and the first sealing element has an opening communicating with the anode. An anode current collector plate has one surface in tight contact with the other surface of the first sealing element, and a through-hole communicating with the opening of the first sealing element. A second sealing element has one surface in tight contact with the other surface of the anode current collector plate, and an opening communicating with the through-hole of the anode current collector plate. The anode, the opening of the first sealing element, the through-hole of the anode current collector plate and the opening of the second sealing element define in the anode chamber a flow passage for gas and liquid. A conduit is provided to connect the flow passage to a separator for collecting gas generated in the anode chamber. A flange is also provided and fastened to the conduit, the second sealing element, the anode current collector plate and the first sealing element for providing tight contact therebetween. The flange has means for fastening the conduit to the separator. A casing defines the anode chamber and the cathode chamber and has a bottom wall.

In one embodiment of the invention, each of the flange, the conduit, the second sealing element, the anode current collector plate and the first sealing element has a hole. A bolt fastens the flange to the conduit, the second sealing element, the anode current collector plate and the first sealing element through the holes.

The means for fastening the conduit to the separator may be a hole provided in the flange. The cell further comprises a bolt extending through the hole for attaching the flange to the separator.

In an embodiment, the cell further comprises a third sealing element fitted on the cathode and the membrane to surround and seal circumference of the cathode, one surface of the third sealing element being in tight contact with the one surface of the membrane, and the third sealing element having an opening communicating with the cathode. A cathode current collector plate has one surface in tight contact with the other surface of the third sealing element, and a through-hole communicating with the opening of said third sealing element. A fourth sealing element has one surface in tight contact with the other surface of the cathode current collector plate, and an opening communicating with the through-hole of the cathode current collector plate. The bottom wall of the casing is in tight contact with the other surface of the fourth sealing element.

Each of the third sealing element, the cathode current collector plate, the fourth sealing element and the casing has a hole. The bolt also fastens the flange to the third sealing element, the cathode current collector plate, the fourth sealing element and the casing through the holes.

DESCRIPTION OF PREFERRED EMBODIMENTS

As a preferred embodiment of the present invention, an aqueous electrolysis cell 100 for generating ozone gas is hereinafter explained.

Figure 1:
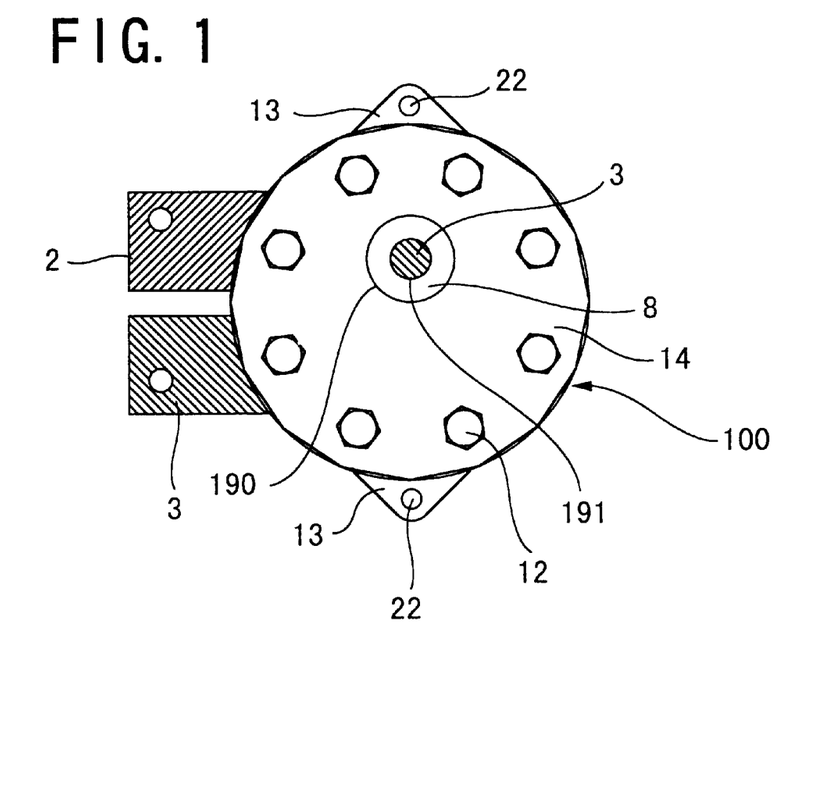
FIG. 1 is an schematic elevational front view of a cell according to an embodiment of the invention.

For the convenience of explanations, the side of the cell 100 in its usual orientation as shown in FIG. 1 is indicated as the front, although the orientation or attitude of the cell 100 in which it can be operated is not always limited to a particular one, as will be mentioned later.

Figure 2:
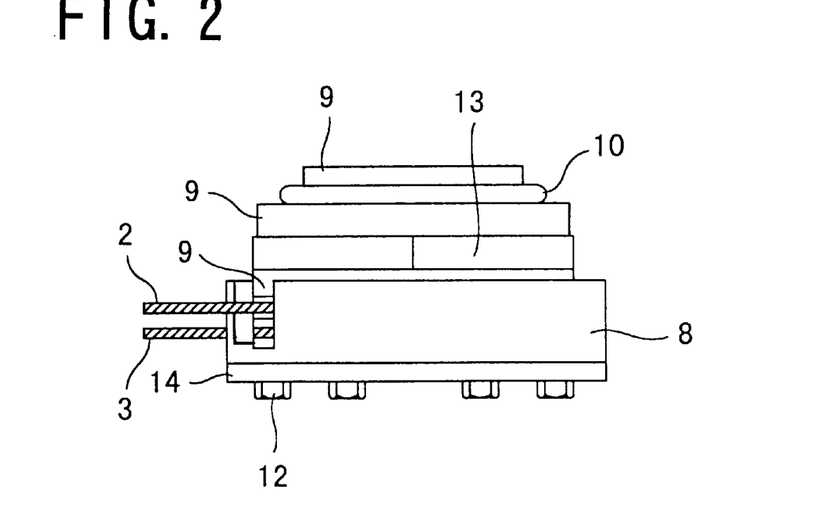
FIG. 2 is a plan view of the cell.
Figure 3:
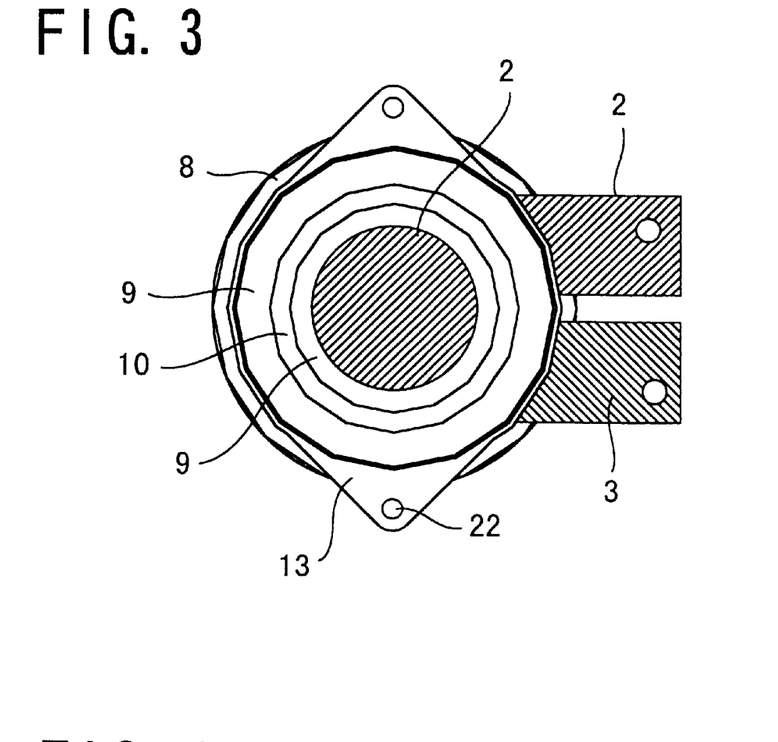
FIG. 3 is an elevational rear view of the cell.

To begin with, an assembled cell 100 is briefly explained with FIGS. 1–3. The cell 100 has a generally cylindrical shape, showing its schematic front elevation in FIG. 1. The cell 100 has an anode current collector plate 2 and a cathode current collector plate 3. The plate 2 is extending leftward from inside of the cell 100. The plate 3 is also extending leftward from inside of the cell 100. The plate 2 and plate 3 are spaced apart from each other and are connected to a proper power source (not shown in the figures).

Further, the cell 100 is provided with a pair of flanges 13, one of which extending upward and the other extending downward. An ozone user facility which can be supplied ozone gas and oxygen gas from anode chamber of the cell 100 would be, in many cases, provided with a container or something like that for the purpose of receiving aqueous solution that communicates with the anode chamber of the cell 100. The container constitutes a separation equipment for separation of gas from liquid. Each of the flanges 13 acts for attaching the cell 100 to this kind of container. For this purpose, each of the flanges 13 has a hole 22 for receiving a bolt.

The cell 100 has a casing 8 which has an opening 191 to which a suitable pipeline 19 for letting out a mixed fluid of hydrogen gas and water is connected. Further, a reinforcement plate 14 is provided at front side of the casing 8. The reinforcement plate 14 has an opening 190 in alignment with the opening 191 of the casing 8. This alignment is for the purpose of letting the pipeline 19 extend though the opening 190. In the FIG. 1, the casing 8 is partly visible through the opening 190. Further, the cathode current collector plate 3 located inside is visible through the opening 191. From the outside of the reinforcement plate 14, eight bolts 12 are inserted into corresponding female threads formed in the flanges 13. The bolts are screwed so that the bolts and female threads are tightened against each other so as to keep the following components secured together tightly, i.e., the reinforcement plate 14, the casing 8, four sealing elements (which will be explained later), the cathode current collector plate 3, the anode current collector plate 2, and a tubular connection element 9 (which will be explained later), thus forming the cell 100.

In FIG. 2, a plan view of the cell 100 is shown. An upper one of the aforementioned two flanges 13 that are fitted at the circumference of the tubular connection element 9 that can be connected to the aforementioned kind of container is indicated in the figure. An O-ring 10 made of fluororesin that is fitted on the circumference of the tubular connection element 9 is also shown.

FIG. 3 is an elevational backside view of the cell 100. The anode current collector plate 2 is located at a position deeper than an opening of the tubular connection element 9. The plate 2 is partly visible through the opening.

Now, details of components consisting the cell 100 will be discussed.

Figure 4:
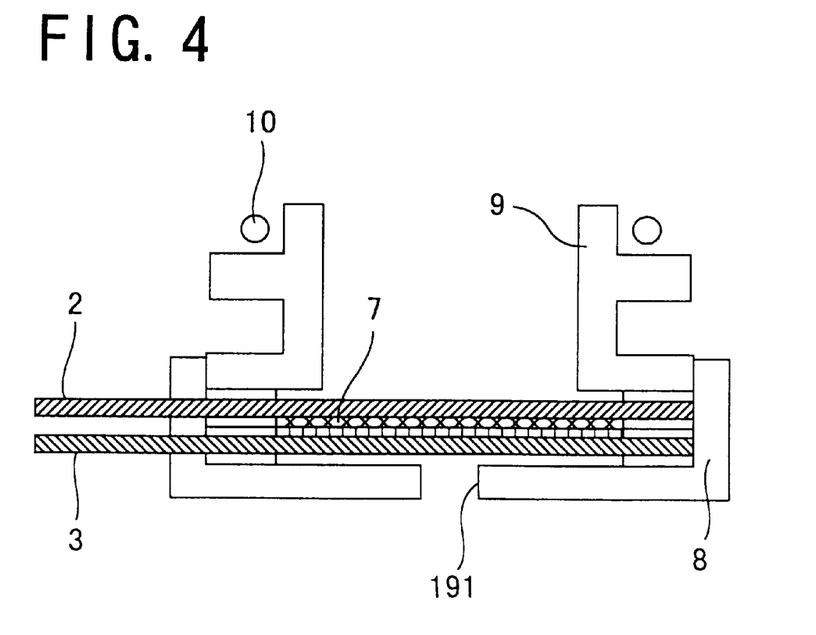
FIG. 4 is a horizontal section showing relationship of some components of the cell.
Figure 5:
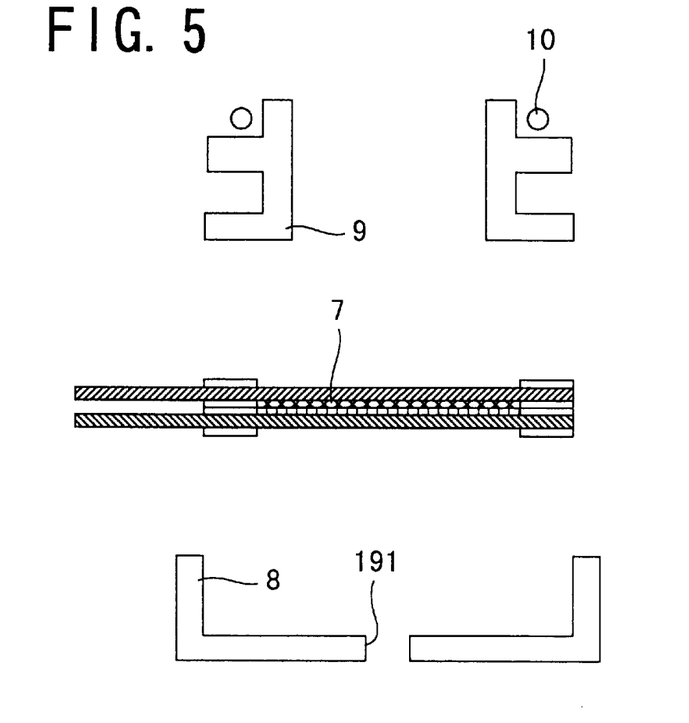
FIG. 5 is an exploded view thereof.
Figure 6:
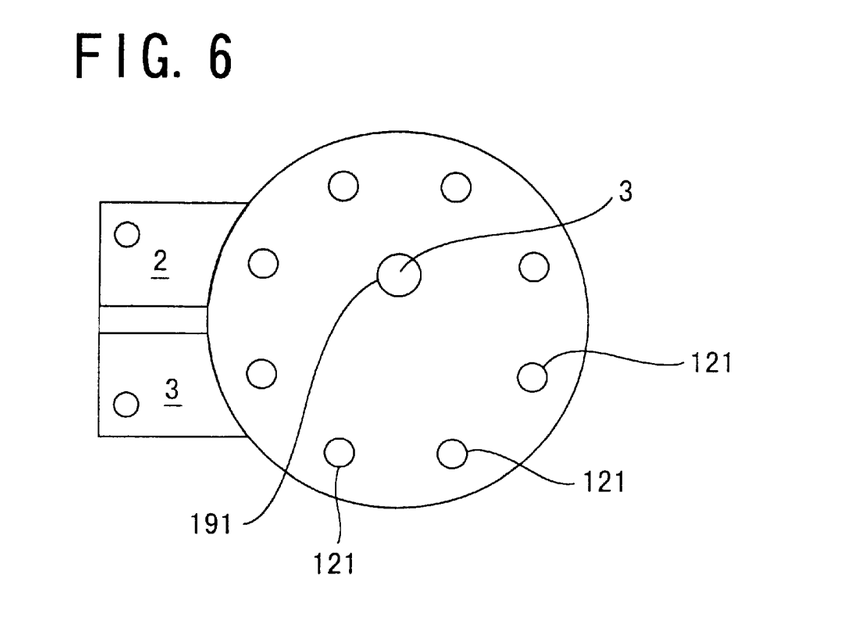
FIG. 6 is an elevational front view thereof.
Figure 7:
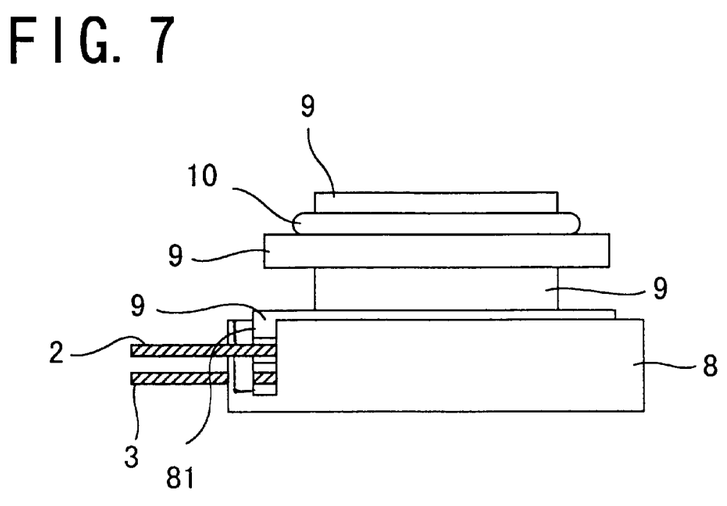
FIG. 7 is a plan view thereof.
Figure 8:
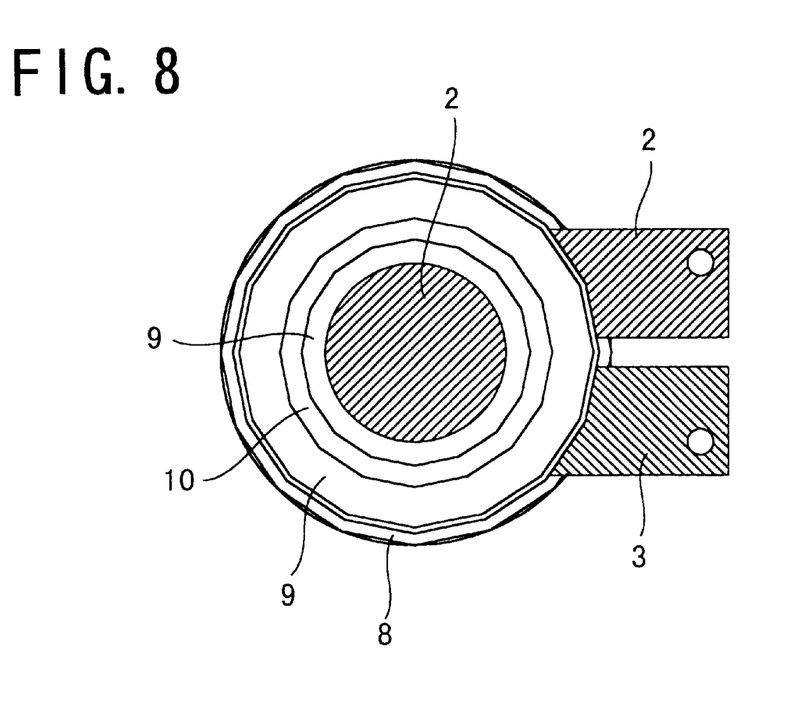
FIG. 8 is an elevational rear view thereof.

Relationships of the casing 8, the tubular connection element 9, the O-ring 10 and a pair of electrodes 7, are shown a schematic horizontal section in FIG. 4, an exploded view in FIG. 5, an elevational front view in FIG. 6, a plan view in FIG. 7 and an elevational backside view in FIG. 8. As will be understood with these drawings, main portions of the pair of electrodes are housed in the casing 8 and especially at the side near the opening 191 of the casing 8. On the other hand, the anode current collector plate 2 and the cathode current collector plate 3 which consist the pair of electrodes 7 are located extending to the outside through a pair of recessed cutouts 81 of circumference of a cylindrical portion of the casing 8. The tubular connection element 9 has a generally cylindrical inner pass. The element 9 is extending radially outwardly at one end thereof, which is to be pushed against the pair of electrodes 7, thereby making a closed annular seal substantially impervious to both of gas and liquid, between the pair of electrodes 7 and the connection element 9. At an location which is to be nearer to the other end thereof, as compared with the above mentioned radial extension, the connection element 9 has a second radially outwardly extending portion which is to be used as an stopper for the O-ring 10 which is fitted on the circumference of the element 9.

Figure 9:
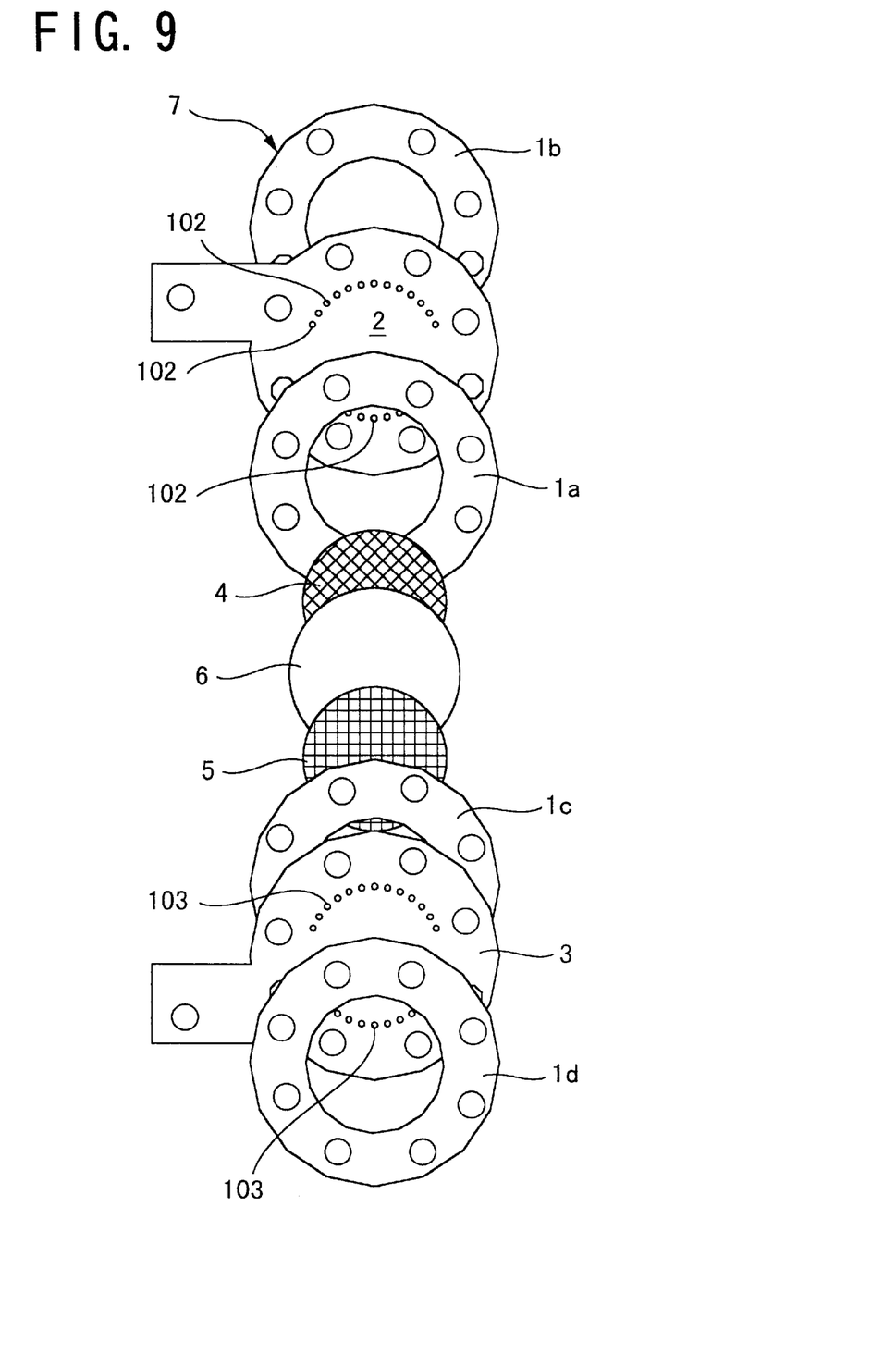
FIG. 9 is a schematic exploded view showing a electrode subassembly.
Figure 10:
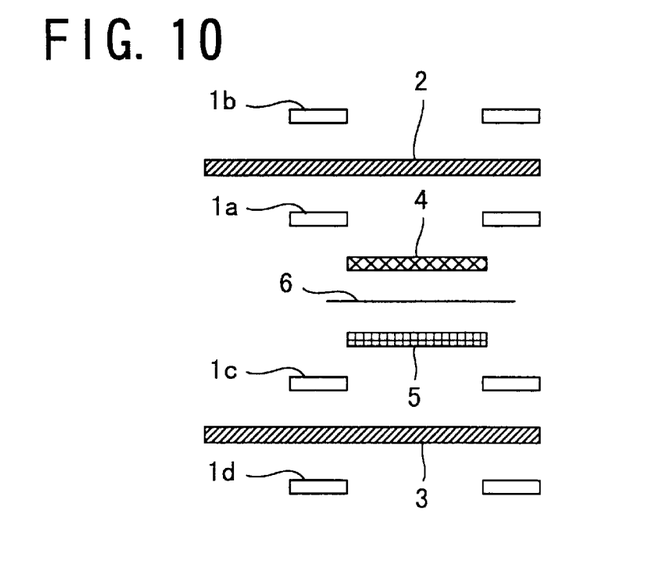
FIG. 10 is a schematic exploded view in horizontal section of the subassembly.

Constituents elements of the electrodes portion 7 are explained as in the followings, referencing a schematic view of FIG. 9 and a horizontal section of FIG. 10. The electrodes portion 7 has an anode 4 and a cathode 5, wherein the anode 4 has a structure permeable to both of gas and water. The anode 4 is to be closely contacted against a backside surface of a cation-exchanger membrane 6. The cathode 5 also has a structure permeable to both of gas and water. The cathode 5 is to be closely contacted against front surface of the cation-exchanger membrane 6.

Further, a first generally flat and thin doughnut-like sealing element la which has a central opening is located, in tight contact with the aforementioned backside surface of the cation-exchanger membrane 6. Thus, a closed annular seal surrounding the periphery of the anode 4, surrounded by the periphery of the sealing element la, is achieved. In positions outer than the annular seal, eight through holes are formed in substantially equally spaced apart positions, as a whole making a circle. Six of the eight holes are shown in FIG. 9.

The anode current collector plate 2 is located with one of its surfaces in tight contact with the backside surface of the first sealing element 1a. The plate 2 has a generally disc-shaped portion and eight through holes in the vicinity of the periphery of the disc-shaped portion. The eight through holes of the plate 2 are aligned with the aforementioned eight through holes of the first sealing element. At more central positions than the eight through holes of the plate 2, a plurality of openings 102 are located on a hypothetical generally circular line. These plurality of openings 102 of the plate 2 communicate the central opening of the first sealing element la and further communicate the anode 4 via the central opening. As shown in the FIG. 9, at least one of the openings 102 is located to be in the vicinity of the upper periphery of the central opening of the first sealing element 1a. The plate 2 has a lug portion adapted to be connected to an electric power source for the electrolysis. This lug portion sticks out leftward from the generally disc-shaped portion of the plate 2.

Further, a second generally flat and thin doughnut-like sealing element 1b which has a central opening is located, in tight contact with the backside surface of the plate 2. The second sealing element 1b has eight through holes to be aligned with the aforementioned eight through holes of the plate 2. The central opening of the second sealing element 1b is positioned and formed to communicate with the aforementioned plurality of openings 102 of the plate 2. In the vicinity of upper periphery of the central opening of the second sealing element 1b, at least one of the plurality of openings 102 is positioned, to communicate with the central opening. The second sealing element 1b is located making an annular tight contact with the backside surface of the plate 2, thereby making an annular sealed structure in the area outer than the plurality of central openings 102 of the plate 2.

Further, a third generally flat and thin doughnut-like sealing element 1c which has a central opening is located, in tight contact with the aforementioned front surface of the cation-exchanger membrane 6. Thus, a closed annular seal surrounding the periphery of the cathode 5, the periphery of the cathode 5 being surrounded by the periphery of the sealing element 1c, is achieved. In positions outer than this annular seal, eight through holes are formed in substantially equally spaced apart positions, as a whole making a circle.

The cathode current collector plate 3 is located with its one surface in tight contact with the front surface of the third sealing element 1c. The plate 3 has a generally disc-shaped portion and eight through holes in the vicinity of the periphery of the disc-shaped portion. The eight through holes of the plate 3 are aligned with respect to the aforementioned eight through holes of the third sealing element 1c. At more central positions than the eight through holes of the plate 3, a plurality of openings 103 are located on a hypothetical generally circular line. These plurality of openings 103 of the plate 3 communicate the central opening of the third sealing element 1c and further communicate the cathode 5 via the central opening. As shown in the FIG. 9, at least one of the openings 103 is located to be in the vicinity of the upper periphery of the central opening of the third sealing element 1c. The plate 3 has a lug portion adapted to be connected to the electric power source for the electrolysis. This lug portion sticks out leftward from the generally disc-shaped portion of the plate 3.

Further, a fourth generally flat and thin doughnut-like sealing element 1d which has a central opening is located, in tight contact with the front surface of the plate 3. The fourth sealing element id has eight through holes to be aligned with the aforementioned eight through holes of the plate 3. The central opening of the fourth sealing element Id is positioned and formed to communicate with the aforementioned plurality of openings 103 of the plate 3. In the vicinity of upper periphery of the central opening of the fourth sealing element 1d, at least one of the plurality of openings 103 is positioned, to communicate with the central opening. The fourth sealing element 1d is located making an annular tight contact with the front surface of the plate 3, thereby making an annular sealed structure in the area outer than the plurality of central openings 103 of the plate 3.

The first, second, third and fourth sealing elements 1a–1d are made of polytetrafluoroethylene (PTFE), that is a kind of fluororesin. The anode current collector plate 2 and the cathode current collector plate 3 are made of titanium. In the anode 4 used is porous titanium as a base material, which is finished by plating with lead dioxide. In the cathode 5 used is porous titanium as a base material, which is finished by plating with platinum. The cation-exchanger membrane 6 is made of the kind of cation-exchange resin, which is known by the trademark of "Nafion 117", a product from Du Pont.

Figure 11:
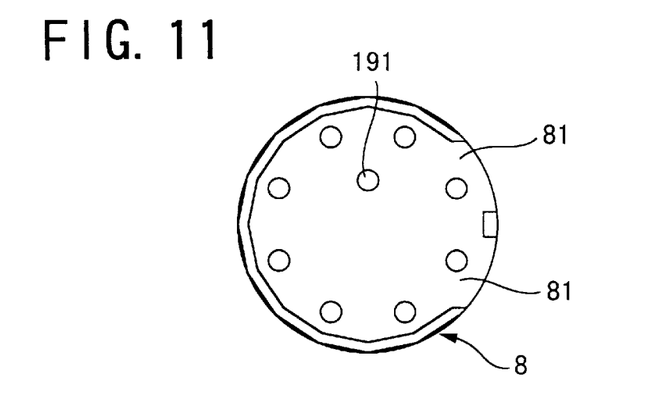
FIG. 11 is an elevational rear view of a casing of the cell.

The casing 8 is explained making a reference to FIG. 11, the backside elevation. The casing is a generally hollow and cylindrical element, of which backside being a large opening in order that the pair of electrodes 7 are brought into via the large opening. The casing 8 has, on the right side in this FIG. 11, a pair of cutouts 81 cut at the circumference of its cylindrical portion. These cutouts 81 allows the lug portion of the anode current corrector plate 2 and the lug portion of the cathode current corrector plate 3 to stick out therethrough. The cutouts 81 directly communicate or reach the large opening in such a manner that the anode current collector plate 2 and the cathode current collector plate 3 can be brought in the casing 8 and can be placed properly via the large opening and the pair of cutouts 81. The front of the casing 8 is for the most part closed but has eight through holes which are to be aligned with the aforementioned eight through holes of the fourth sealing element 1d. The front of the casing 8 has the opening 191 to be connected to the suitable pipeline 19 for letting out the mixed fluid of hydrogen gas and water. The casing 8 is made of polypropylene.

Figure 12:
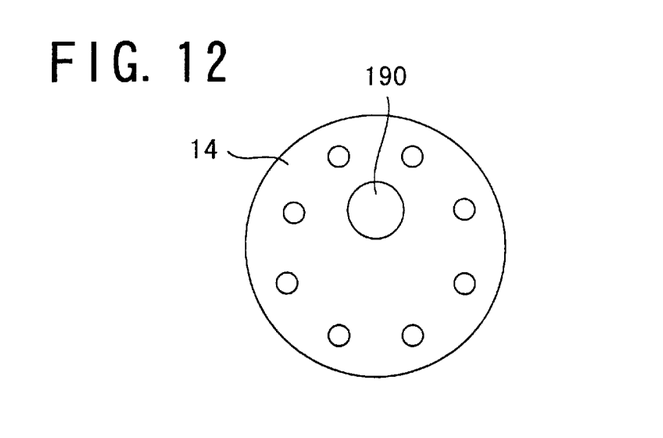
FIG. 12 is an elevational front view of a plate of the cell.

As seen from the front elevation of FIG. 12, the reinforcement plate 14 is generally disk-shaped and has eight through holes in the vicinity of its periphery which are to be aligned with the aforementioned eight through holes of the casing 8. The plate 14 also has the aforementioned opening 190 which is to be in alignment with and larger than the opening 191 of the casing 8. This reinforcement plate 14 is made of stainless steel of the type "SUS 304" in JIS (Japanese Industrial Standard).

Figure 13:
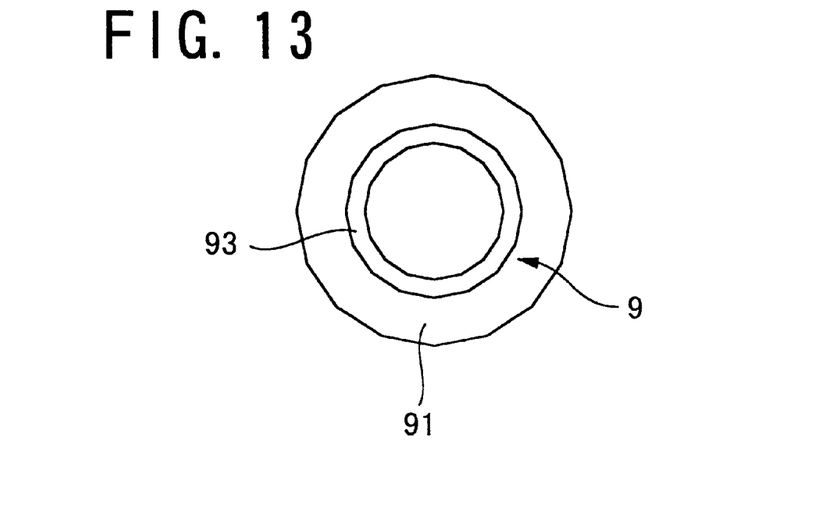
FIG. 13 is an elevational rear view of a conduit of the cell.
Figure 14:
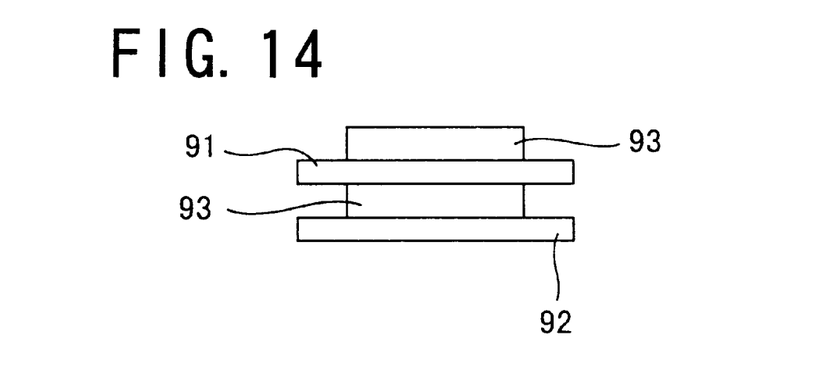
FIG. 14 is a plan view thereof.
Figure 15:
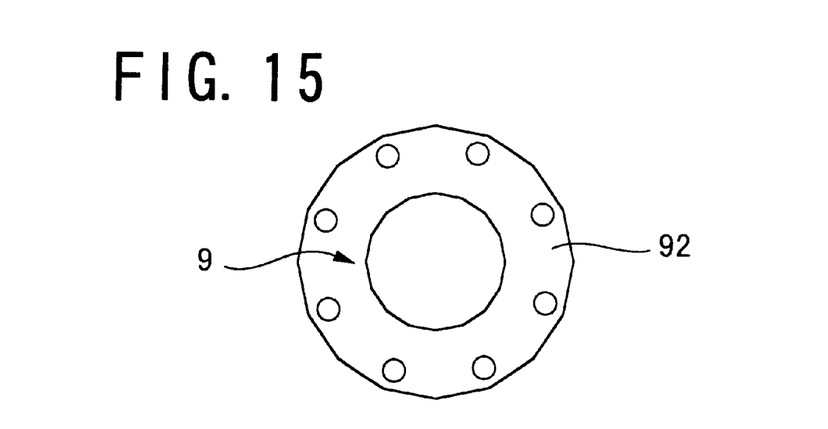
FIG. 15 is an elevational front view thereof.

The tubular connection element 9 has a cylindrical portion 93 which defines its aforementioned inner pass, as is clearly understood referencing the backside view of FIG. 13, plan view of FIG. 14 and front elevation of FIG. 15. The element 9 extends radially outwardly at its front end, thereby defining a first doughnut-type disc-shaped portion 92. The first doughnut-type disc-shaped portion 92 has eight through holes in the vicinity of its periphery which are to be aligned with the aforementioned eight through holes of the second sealing element 1b. Further, the element 9 extends radially outwardly from the circumference of the cylindrical portion 93, thereby defining a second doughnut-type disc-shaped portion 91. The second doughnut-type disc-shaped portion 91 is at the back of and spaced apart from the first doughnut-type disc-shaped portion 92. In the vicinity of the cylindrical portion 93, the backside surface of the second doughnut-type disc-shaped portion 91 can be used as a stopper for the aforementioned O-ring 10. The O-ring is fitted to secure good sealing property when connecting the cell 100 to a container for the aforementioned separation of liquid and gas. The connection element 9 is made of poly-tetrafluoro-ethylene (PTFE), that is a kind of fluororesin. The O-ring 10 is made of fluororubber.

Figure 16:
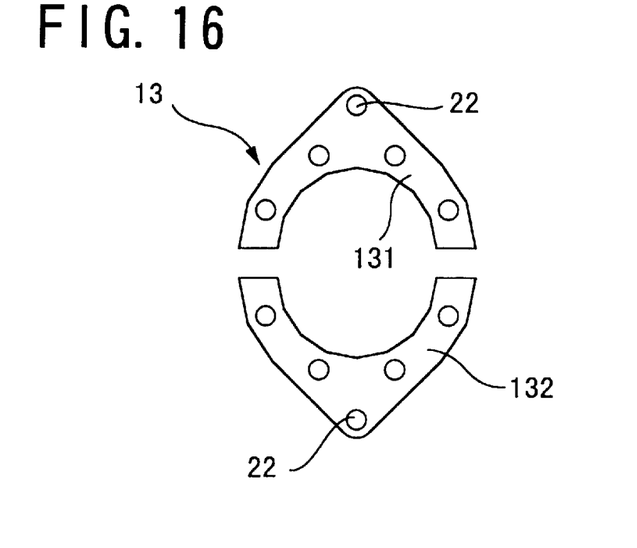
FIG. 16 is an elevational front view of a pair of flanges of the cell.

As shown in the front elevation of FIG. 16, the pair 13 of flanges is a set of two flat members 131 and 132. Each of the members 131 and 132 is generally arch-shaped. The arch-shaped member 131 has four holes for receiving bolts. These four holes are adapted to be aligned with upper four of the aforementioned eight through holes of the first doughnut-type disc-shaped portion 92. The arch-shaped member 132 has four holes for receiving bolts. The four holes of the member 132 are adapted to be aligned with lower four of the aforementioned eight through holes of the first doughnut-type disc-shaped portion 92. Each of the four holes of the member 131 and the four holes of the member 132 has a round inner surface which is threaded to properly receive corresponding one of eight bolts 12 which is screwed into the hole. The total eight bolts 12 are tightly screwed to fit onto the threaded inner surfaces of the four holes of the member 131 and the four holes of the member 132. In other words, female threads or nuts corresponding to the bolts 12 are integrally formed with the pair 13 of flanges, forming the four holes for receiving four bolts per each piece of flange. To attach the pair 13 of flanges, the arch-shaped members 131 and 132 are inserted and fitted between the first and second doughnut-type disc-shaped portions 92 and 91. They are positioned making sure that the total eight female threads are in alignment with the eight through holes of the first doughnut-type disc-shaped portion 92. Further, the top portion of each of the arch-shaped members 131 and 132 is shaped to have a part which extends outwardly in a radial direction, more than is necessary to form a mere top portion of the arch. Each of the part has a through hole 22 for a bolt which will be tightly screwed into the hole 22 in order to fix and support the tubular connection element 9 onto the outer structure of the aforementioned container for separation of gas from liquid. It is the only two bolts that need to be tightened to fix and support the tubular connection element 9 onto the outer structure of the aforementioned container. The two bolts and the arch-shaped members 131 and 132 are made of stainless steel (SUS304).

Figure 17:
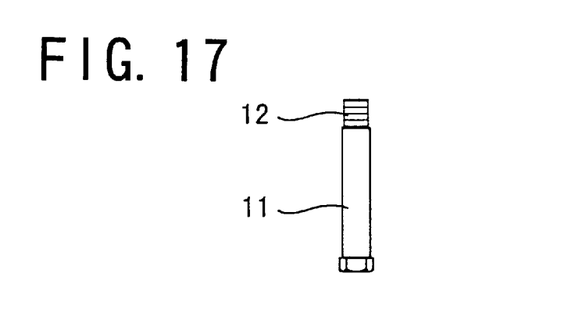
FIG. 17 is a schematic plan view showing a bolt and a tube of the cell 100.
Figure 18:
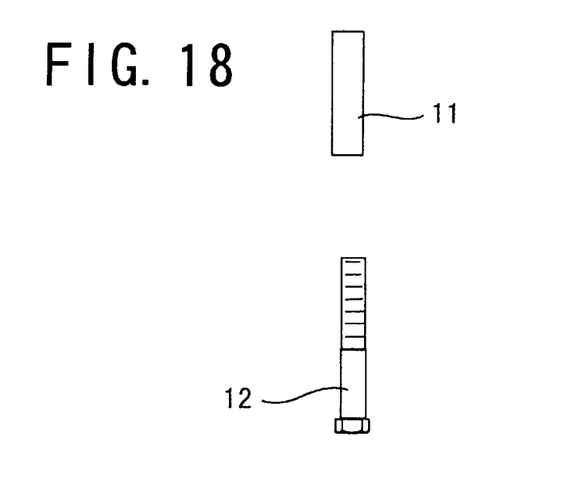
FIG. 18 is an exploded plan view thereof

The eight bolts 12 can be made of stainless steel (SUS304). Portions of their stems in the neighborhood of their tips are fixed in the female threads of the flanges 13 by screwing. Other portions of the stems are electrically insulated from the aforementioned current collector plates and the electrodes by insulation tubes 11 in which the portions are fitted as shown in FIG. 17. The insulation tubes 11 are made of PTFE. Therefore, even when the sealing by the first, the second, the third and the fourth sealing elements are becoming weak and ozone gas or ozone water is leaking towards vicinage of the bolts, the bolts 12 are protected by the corrosion resistant tubes 11 around the vicinage, enabling to continue the operation as long as the other circumstances permits. FIG. 18 shows an exploded plan view of one of the tubes 11 and one of the bolts 12.

Figure 19:
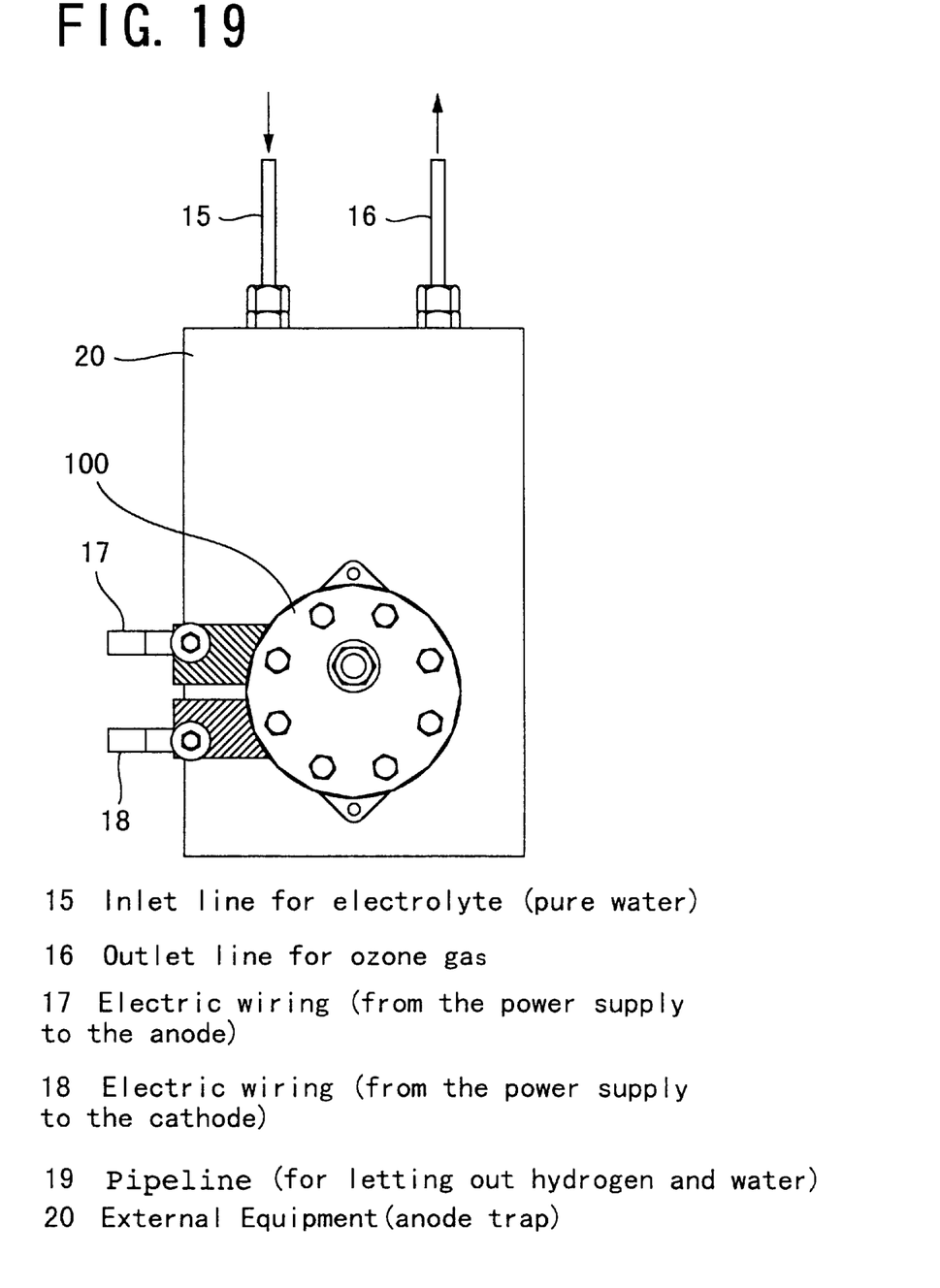
FIG. 19 is an elevational front view showing the cell attached to a separator.
Figure 20:
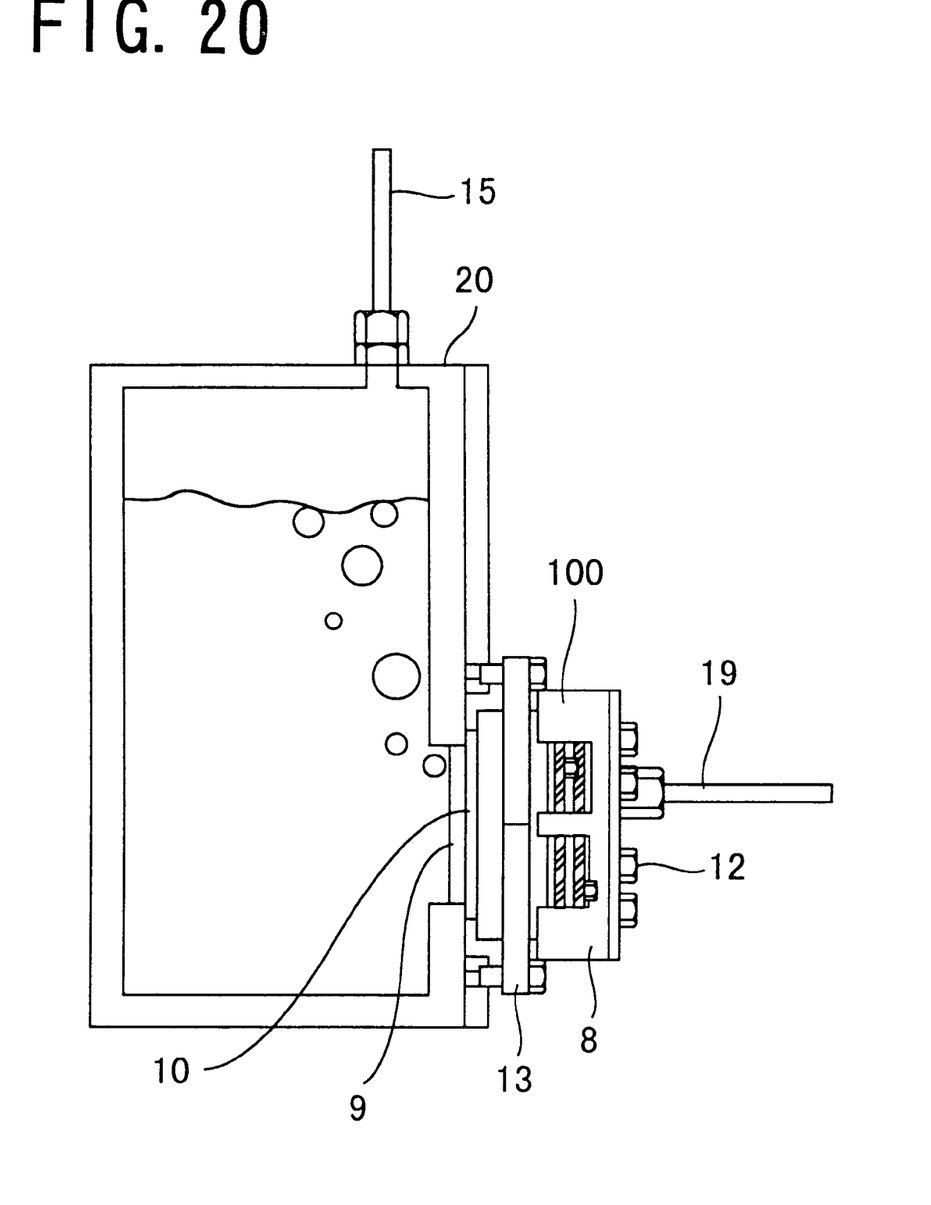
FIG. 20 is a partly sectioned view thereof but seen from the left.

An aqueous electrolysis cell 100 for generating ozone gas as shown in FIGS. 1–3 was fabricated by assembling the above mentioned parts. Operation test of the cell 100 was carried out in an attitude as shown in the front elevation of FIG. 19 and in the right side view of FIG. 20. In this attitude, the cell was connected to, fixed to, and supported by an external equipment 20 for separation of gas from liquid. After supplying pure water, the electrolysis reaction was started at an electric current density of 100 ampere/dm$^2$. 24 hours later, ozone gas concentration of the mixed gas recovered from the anode chamber was 230 g/m$^3$.

While the preferred embodiment of the present invention have been described using the specific terms, such description is for illustrative purposes only, and it is to be understood that changes and variations may be made without departing from the spirit or scope of the invention.

For example, as for the aqueous solution which is to be supplied to the anode and is to be electrolyzed, in the above embodiment, the solution is supplied via the external container of the equipment for separating gas from liquid and then via the tubular element 9. However, in a variation, the supply line of the aqueous solution may be located independently, for instance, as a pipeline directly connecting into the tubular element 9 through the cylindrical surface of the tubular element 9. The portion 91 might not be in the donut-type shape but in a shape suitably detouring the supply line.

The pair of flange 13 might not be limited in the two-part form, that is to say, it can be made as a set of more than two parts, including various changes in forms or shapes.

The anode was made of porous titanium substrate plated with lead dioxide. However, in a variation, the anode can be made of expanded titanium plated with lead dioxide. The cathode was made of porous titanium substrate plated with platinum. However, in a variation, the cathode can be made of expanded titanium plated with platinum. In another variation, carbon electrode might be employed.

The cell in the above mentioned embodiment is preferably operated in an orientation or attitude with the anode and the cathode separated from each other by a membrane, defining the cathode in the front and the anode in the back. However it has been confirmed that the cell can be operated in a lied-down attitude with the anode in the upside.

It should be understood that, according to the invention, provided is an aqueous electrolysis cell, in which maintenance labors and costs are greatly reduced because of easy attachment and replacement of the cell to and from the anode trap. Also, the cell can be made in a very thin, compact shape. Further, the cell is improved in usage flexibility as compared with conventional ones because the connection structures at the anode trap side can be very simple. Further, in the above embodiment, it is easy to assemble the first sealing element, the anode, the membrane, the anode current collector plate, the second sealing element, the cathode, the third sealing element, the cathode current collector plate and the fourth sealing element by utilizing the insulation tubes 11 as guiding members which increase the working efficiency in positioning of the parts.

We claim:

1. An aqueous electrolysis cell for generation of gas comprising an electrolysis container having an anode chamber and a cathode chamber separated from each other by a membrane, said cell being adapted to generate by electrolysis reaction of water oxygen and ozone in said anode chamber and hydrogen in said cathode chamber, said cell further comprising:

an anode having permeability to gas and water and fitted on said membrane in such a manner that one surface of said anode is in contact with one surface of said membrane;

a cathode having permeability to gas and water and fitted on said membrane in such a manner that one surface of said cathode is in contact with the other surface of said membrane;

a first sealing element fitted on said anode and said membrane to surround and seal circumference of said anode, one surface of said first sealing element being in tight contact with said one surface of said membrane, said first sealing element having an opening communicating with said anode;

an anode current collector plate having one surface in tight contact with the other surface of said first sealing element, said anode current collector plate having a through-hole communicating with said opening of said first sealing element;

a second sealing element having one surface in tight contact with the other surface of said anode current collector plate, said second sealing element having an opening communicating with said through-hole of said anode current collector plate;

said anode, said opening of said first sealing element, said through-hole of said anode current collector plate and said opening of said second sealing element defining in said anode chamber a flow passage for gas and liquid;

a conduit connecting said flow passage to a separator for collecting gas generated in said anode chamber;

a flange fastened to said conduit, said second sealing element, said anode current collector plate and said first sealing element for providing tight contact therebetween, said flange having means for fastening said conduit to the separator; and a casing for defining said anode chamber and said cathode chamber and having a bottom wall.

2. A cell as claimed in claim 1, further comprising: a third sealing element fitted on said cathode and said membrane to surround and seal circumference of said cathode, one surface of said third sealing element being in tight contact with said one surface of said membrane, said third sealing element having an opening communicating with said cathode;

a cathode current collector plate having one surface in tight contact with the other surface of said third sealing element, said cathode current collector plate having a through-hole communicating with said opening of said third sealing element; and a fourth sealing element having one surface in tight contact with the other surface of said cathode current collector plate, said fourth sealing element having an opening communicating with said through-hole of said cathode current collector plate;

said bottom wall of said casing being in tight contact with the other surface of said fourth sealing element.

3. A cell as claimed in claim 2, wherein each of said third sealing element, said cathode current collector plate, said fourth sealing element and said casing has a hole.

4. A cell as claimed in claim 3, wherein each of said flange, said conduit, said second sealing element, said anode current collector plate and said first sealing element has a hole, and further comprising a bolt for fastening said flange to said conduit, said second sealing element, said anode current collector plate, said first sealing element, said third sealing element, said cathode current collector plate, said fourth sealing element and said casing through said holes.

5. A cell as claimed in claim 1, wherein each of said anode current collector plate and said cathode current collector plate includes a lug connected to a power supply and said casing has a cutout, said lug extending through said cutout.

6. A cell as claimed in claim 1, wherein each of said flange, said conduit, said second sealing element, said anode current collector plate and said first sealing element has a hole, and further comprising a bolt for fastening said flange to said conduit, said second sealing element, said anode current collector plate and said first sealing element through said holes.

7. A cell as claimed in claim 6, further comprising an insulation tube fitted on said bolt.

8. A cell as claimed in claim 1, further comprising an O-ring fitted on said conduit for providing tight contact between said conduit and the separator.

9. A cell as claimed in claim 1, wherein the means for fastening said conduit to the separator comprises a hole provided in said flange, and the cell further comprising a bolt extending through said hole for attaching said flange to the separator.

* * * * *